Figure 1:
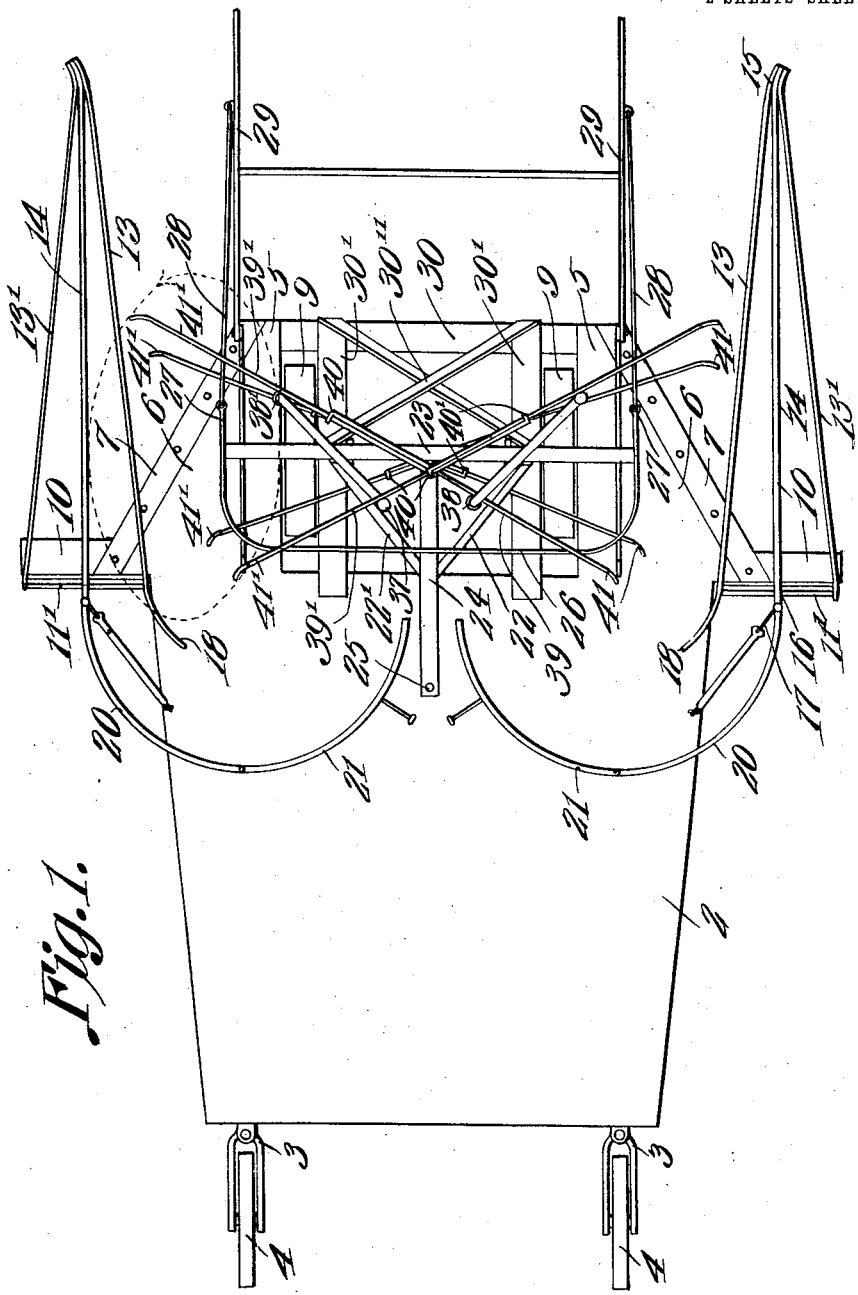

O. P. VROOM.
CORN HARVESTING MACHINE.
APPLICATION FILED JUNE 14, 1911.

1,033,360.

Patented July 23, 1912.

2 SHEETS—SHEET 1.

Witnesses

O. P. Vroom,
Inventor by C. A. Snow & Co.
Attorneys

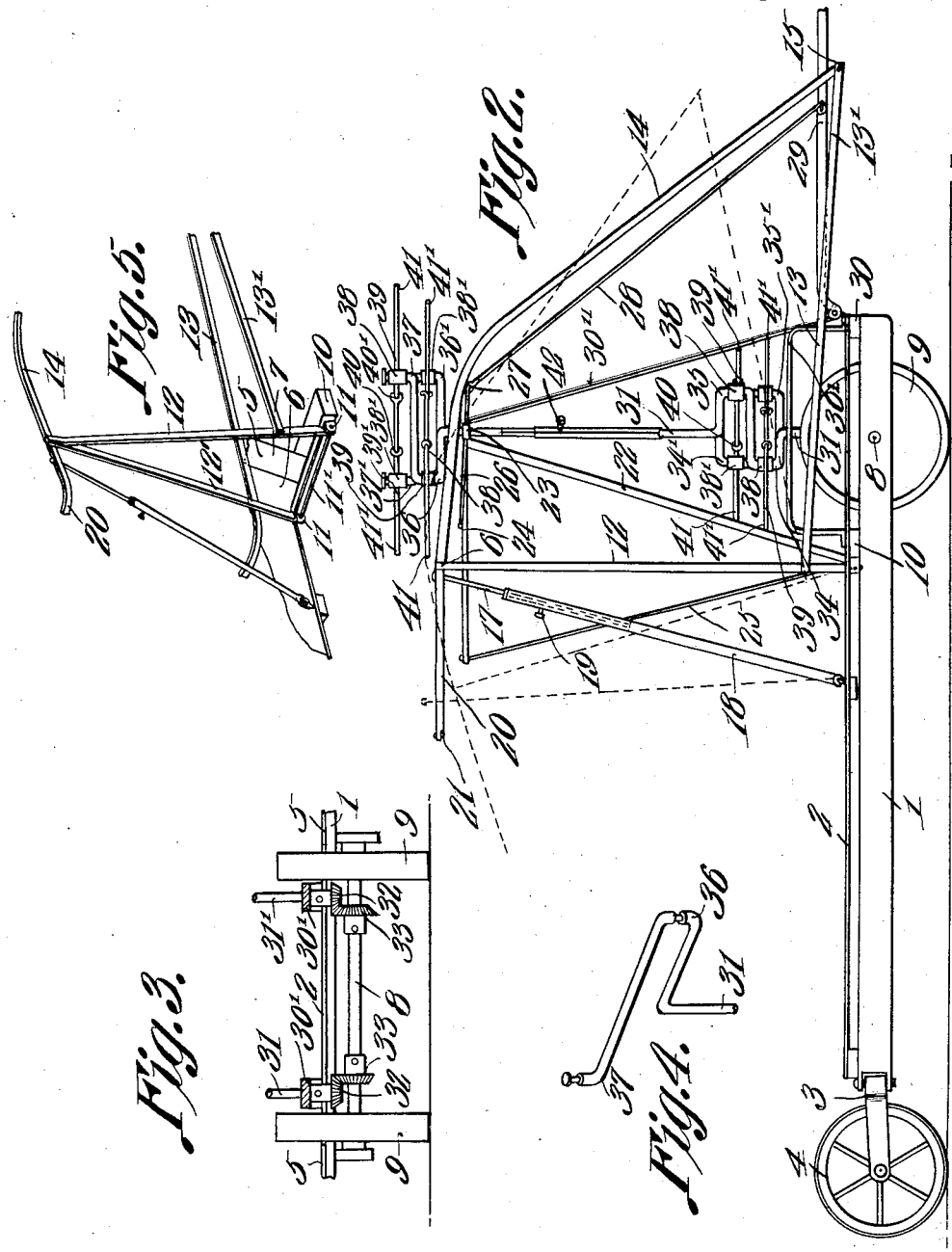

UNITED STATES PATENT OFFICE.

OLER P. VROOM, OF LINNEUS, MISSOURI, ASSIGNOR TO THE SUPERIOR HAY STACKER MFG. CO., OF LINNEUS, MISSOURI.

CORN-HARVESTING MACHINE.

1,033,360.  Specification of Letters Patent.  Patented July 23, 1912.

Application filed June 14, 1911. Serial No. 633,101.

*To all whom it may concern:*

Be it known that I, OLER P. VROOM, a citizen of the United States, residing at Linneus, in the county of Linn and State of Missouri, have invented a new and useful Corn-Harvesting Machine, of which the following is a specification.

The invention relates to improvements in corn harvesting machines, and the primary object of the invention is the provision of a machine adapted to be drawn to cut two rows of standing corn simultaneously, and convey the same butt ends down upon a platform, where the corn stalks thus delivered may be shocked and removed from said platform.

A further object of the invention is the provision of a corn harvesting machine, provided with an angular cutting knife in combination with an adjustable fender, whereby the stalks of standing corn are guided to the knife, and the said knife is protected so that no injury can result from the operator becoming entangled in the knife.

A still further object of this invention is the provision of a corn harvesting machine for cutting two rows of standing corn simultaneously, provided with a traction operated means adapted to engage the corn as it enters or contacts with the cutting blade and to move the same toward the cutting blade and to the rear of the machine, the said device having a peculiar motion imparted thereto, so as to give to the corn a continued rearward movement as it is cut.

A still further object of this invention is the provision of a novel means for feeding the corn from the front toward the rear of the machine during the cutting and after the cutting operation thereof, combined with an improved form of fender and stalk guiding device which assists in feeding the stalks to the cutting blades and retains the said stalks stub end downwardly upon the shocking platform of said machine.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a top plan view of the complete machine. Fig. 2 is a side elevation thereof. Fig. 3 is a detail sectional view showing the operating mechanism for the stalk feeding mechanism. Fig. 4 is a detail perspective view of one of the crank portions of the feeding mechanism removed. Fig. 5 is a detail perspective view of one of the fenders and stalk guiding devices.

Referring to the drawing, the numeral 1 designates the main frame of the machine, which carries the corn stalk receiving platform or plane 2, and has mounted at the rear thereof the caster bracket 3, carrying the wheels 4. The forward end of this frame and platform is provided with the projections 5 having the inclined portions 6 to which are connected the removable stalk cutting blades 7, the shaft 8 carrying the wheels 9, said wheels being journaled so as to pass within the central cut away portion of the frame as clearly illustrated in Fig. 1 of the drawings.

Extending laterally from the frame at opposite sides thereof and just to the rear edge of the cutting knife 7, is an arm 10, provided with lugs 11 to which is pivotally connected a shaft 11', carrying the upwardly and inwardly inclined arms or supports 12 and 12' respectively and extending forwardly of said arms 12 and 12' respectively are a short arm 13 and a long arm 13', which with the long inclined arm 14 comprise the adjustable guard or fender and stalk guiding device. The rear terminals of the curved arms 14 are curved inwardly as at 20 and carry the hinged arms 21 which normally assume the position as shown in Fig. 1 of the drawings, and coacting with these fenders is the U-shaped frame 26, whose forward ends are connected as at 27 with the downwardly projecting stays 28, connected to the shafts 29. By this means the braces 28 and fenders form a guiding means for guiding the stalks of corn to the cutting blades 7 where the standing corn or stalk is cut and moved upon the platform 2 toward the curved arms 20 and 21 of the fenders.

Connected to the main frame in the rear of the wheel space thereof, are the two upwardly and outwardly inclined braces 22 and 22', the upper ends of which are connected to the transverse bar 23, to which is connected the rearwardly extending plate or arm 24, connected and held in such position by means of a rearwardly inclined rod 25 connected to the extreme end of the bar or plate 24 and the frame of the machine at the connection of the braces 22 and 22' thereto. By this means the U-shaped brace or stalk guiding frame 26 is properly supported, as it is connected to the terminals of the transverse bar 23 and to the upper face of the rearwardly extending bar or plate 24.

Connected to the frame and spanning the wheel space, their forward ends being connected to the transverse bar 30 are the two yokes or struts 30' respectively to which are connected the forward crossed bracing rods or bars 30'' thus bracing the stalk feeding mechanism in a rigid upright position with respect to the frame. Journaled in these struts 30' and also in the transverse bar 23, are the two vertically adjustable and rotatable shafts 31 and 31', respectively, upon the lower ends of which are keyed the bevel pinions 32, which in turn mesh with the pinions 33 carried upon the shaft 8 and operated by means of the traction wheels 9.

The shaft 31 is provided with the lower oppositely disposed cranks 34 and 35, and the upper oppositely disposed cranks 36 and 37 respectively, while the vertical shaft 31', is provided with the similar cranks 34', 35', 36', and 37'. The respective cranks of the two shafts are so disposed that when the traction wheels impart rotation to the gears 32, the said shafts 31 and 31' are rotated so that their cranks describe circles in opposite directions.

Mounted upon the cranks 34, 35, 36, and 37, respectively, are the sleeves or collars 38, each one of which has connected thereto the intermediate portion of one of the double arms 39, provided with the stalk engaging terminals 41 and with the eyed-terminal 40; while the crank arms 34', 35', 36' and 37' respectively, carry the sleeves 38', each having connected thereto the intermediate portion of one of the double arms 39', provided with the stalk engaging terminals 41' and the terminal eye 40' respectively. The eye 40 is slidably mounted upon the terminal carrying the eye 40' of the arm 39', while the eye 40' is slidably mounted upon the terminal of the arm 39 carrying the eye 40, and the cranks of the said shafts are so disposed, that the coaction of the shafts, cause the terminals 41 and 41', to be projected and receded from the forward portion of the machine to the rear portion thereof.

By this means the terminals 41 will pass and feed the stalks to the cutter 7 upon the right hand side of the machine, while the terminals 41' will pass and feed the stalks to the cutting knife 7 upon the left hand side of the machine, said terminals 41 and 41' describing ellipses and at all times engaging the stalk so as to give it the proper rearward movement instead of an outward movement and carrying it farther back upon the platform 2 than would be the case if given a rotary movement. By this means a continuous feeding action is given the arms 39 and 39' both at the top and the bottom of the machine, and by means of the adjustable connection 42 between the sections of the shaft the said arms may be raised or lowered according to the height of the growing crop. It will also be noted that by having two sets of arms that the stalk is engaged both above and below the ear thereon and by this means is held in a vertical position between the braces or guides 28 and the fenders and delivered in an upright position to the rear and against the curved arms 20 and 21 of said fenders, where when the stalks have accumulated in the proper bundle or shock, the operator standing upon the platform 2, may gather the same into bundles or shocks and remove them from the platform to the side and out of the path of the machine.

By means of the pivoted or tiltable fenders, the outer terminals 15 thereof may be moved and held in such position by the adjustable connection 19 as to accommodate themselves to the height of the crop upon which the machine is being used and the same are so disposed as to prevent a person from being injured by the cutter blades 7, the same being of such a construction and braced in such a way as to prevent a person from getting into close proximity to said knives. By means of the adjustable braces 17 and 18, the said fenders may be held at the desired inclined position.

By providing the caster wheels 4 at the rear of the platform, the machine may be turned in a very short space when turning at the end of the row or rows and by means of the arrangement of the drive wheels and cutting mechanism, a single animal may be used to draw the harvester so as to cut simultaneously two rows of corn. It is to be understood however that a single fender and a singe cutting device in combination with a single shaft with the stalk engaging and feeding fingers may be employed, without departing from the spirit of this invention.

What is claimed is:—

1. In a corn harvester, the combination of a frame, traction wheels, two cutters carried by the frame one upon each side thereof, a fender disposed to guard each cutter and guide the stalks thereto, one fender to each cutter, two vertically disposed shafts carrying a series of cranks operably connected to the traction wheels, and a stalk engaging arm operably connected to each of said cranks of said shafts, the inner ends of the respective arms of the respective shafts being slidably connected to each other so that the free ends thereof will be disposed in the path to engage the stalks and move them toward the cutters.

2. In a corn harvester, the combination of a frame, a platform carried thereby, traction wheels journaled at the forward end thereof, two cutters, one disposed upon each of the opposite sides of the forward ends of said frame, a fender for each cutter tiltingly connected to the frame and projecting forwardly of the cutter, two vertically journaled shafts operably connected to the traction wheels, each shaft having a plurality of cranks, and a plurality of stalk engaging and feeding arms, one to each crank, operably connected to said cranks, the inner ends of said arms of the respective shafts being disposed in co-active pairs and slidably connected to each other.

3. In a corn harvester, the combination of a frame, a platform mounted thereon, a pair of traction wheels journaled at the forward ends thereof, a pair of caster wheels journaled at the rear ends thereof, a cutter disposed at the forward end at each side of the platform, a frame supported upon the platform, a stationary guide secured thereto and extending forwardly to form a fender and guide for the stalks as they are acted upon by the cutters, an outer guide and fender for each cutter tiltingly connected to the platform and projecting substantially parallel with the stationary guide, two vertically disposed shafts operable from the traction wheels, each shaft having a plurality of cranks and two sets of co-acting stalk engaging and feeding arms operably connected to the cranks of the shafts, the inner ends of said arms of one shaft being slidably connected to corresponding inner ends of the arms of the other shaft and disposed to have their free ends feed the stalks between the guides toward and over the cutters.

4. In a corn harvester, the combination with a frame, traction wheels journaled in the forward portion and within the sides thereof, two cutters connected to the forward edge of the frame one upon each side of the traction wheels, coacting stalk guides and fenders disposed to guide the stalks toward the respective cutters, an upright frame mounted at the forward end of the frame, a pair of shafts journaled in said upright frame, means operably connecting the lower ends of said shafts to the traction wheels, each of said shafts having a plurality of cranks, and a series of pairs of stalk engaging arms operably connected to the cranks of their respective vertical shafts the inner ends of the respective pairs of arms being connected slidably together, the rotation of said shaft imparting movement to the arms, so that the free ends thereof will feed the stalks between the fenders and guides to the cutters.

5. In a corn harvester, the combination of a frame, traction wheels, a cutter carried by said frame at the forward portion thereof, guides for guiding the stalks to the cutters, two vertical shafts operable from the traction wheels, each of said shafts having a crank, a pair of stalk engaging arms operably connected one to the crank of each shaft and having their inner terminals slidably connected to one another, whereby their free ends are projected and retracted from the forward feeding position above and past the cutters through the rotation of both shafts.

6. In a corn harvester, the combination of a frame, traction wheels, a platform, caster wheels mounted at the rear of the platform, two cutters disposed to operate upon two rows of growing corn simultaneously, a stationary and an adjustable guide and fender for each cutter, two vertically disposed shafts provided with a series of crank arms and having their lower ends operably connected to the traction wheels, a plurality of double terminaled arms, one arm being pivotally connected intermediate of its ends to each crank of each shaft, the inner ends of the arms carried by one shaft being connected slidably to the corresponding inner ends of the arms upon the other shaft, whereby the rotation of the shafts will impart to the stalk engaging outer terminals of the arms an elliptical movement.

7. In a corn harvester, a frame, two cutters upon the forward edges thereof, means for feeding the stalks to said cutters, two vertically disposed shafts operably connected to the traction wheels, each shaft having a plurality of cranks, and a plurality of pairs of arms, one of each pair being operably connected to its respective crank of the vertical shaft, the inner ends of each pair of arms being slidably connected to each other, whereby as the arms and the shafts are rotated the outer terminals of the arms have an elliptical movement imparted thereto.

8. In a corn harvester, the combination of a frame, traction wheels, stalk cutting mechanism, two vertically journaled shafts operably connected to the traction wheels, each of said shafts being provided with a series of cranks thereon, and a double ended arm journaled in each crank of said shafts, each of said arms being provided with a stalk engaging terminal, and said arms upon corresponding cranks of the two shafts having their other terminals slidably connected in pairs, whereby the stalk engaging terminals of the arms are given an elliptical movement during the feeding of the stalks to the cutters.

In testimony that I claim the foregoing as my own, I have hereto affixed my signature in the presence of two witnesses.

OLER P. VROOM.

Witnesses:
M. B. FETTY,
Ross WHALEY.